Patented Apr. 9, 1929.

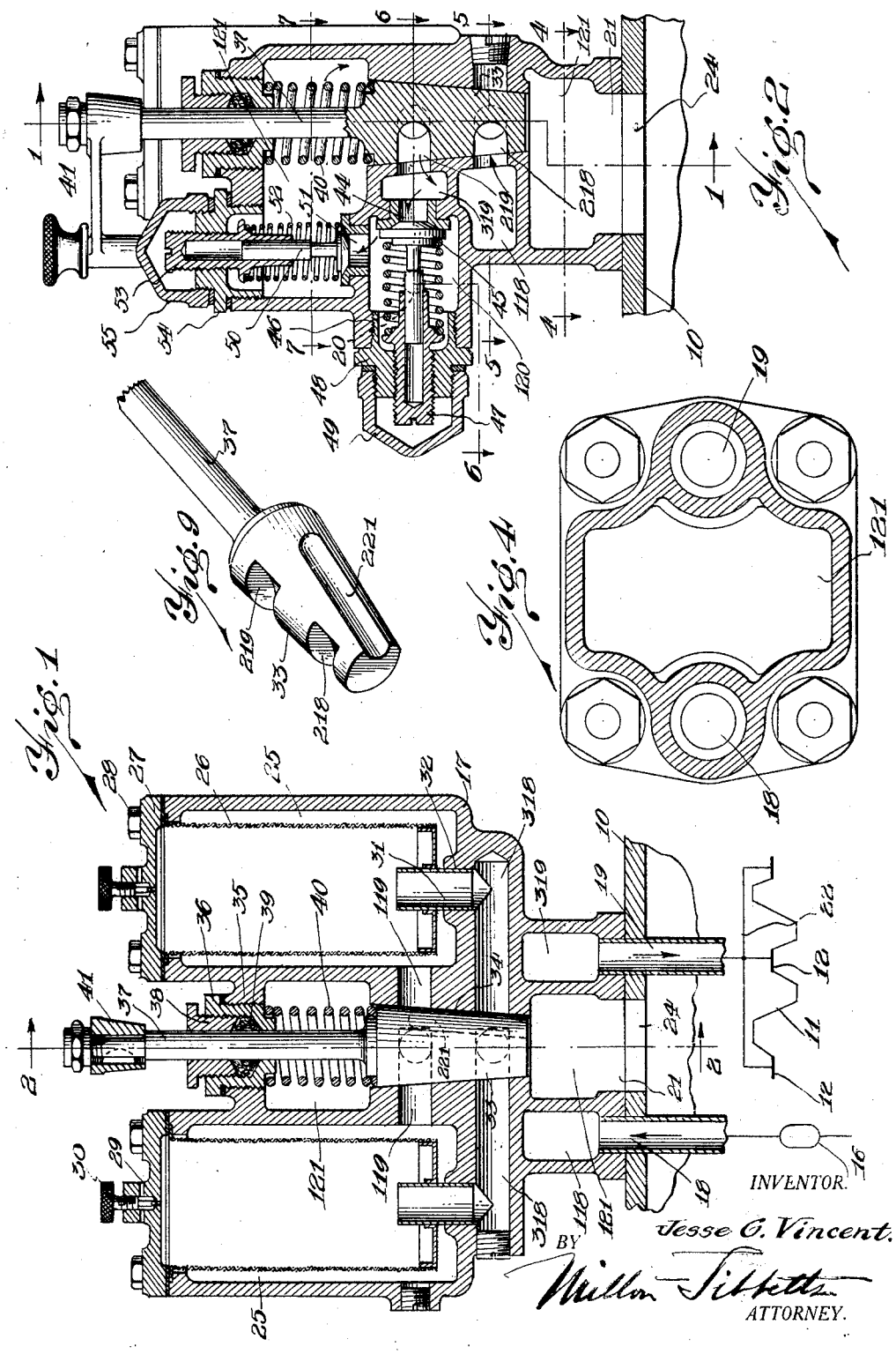

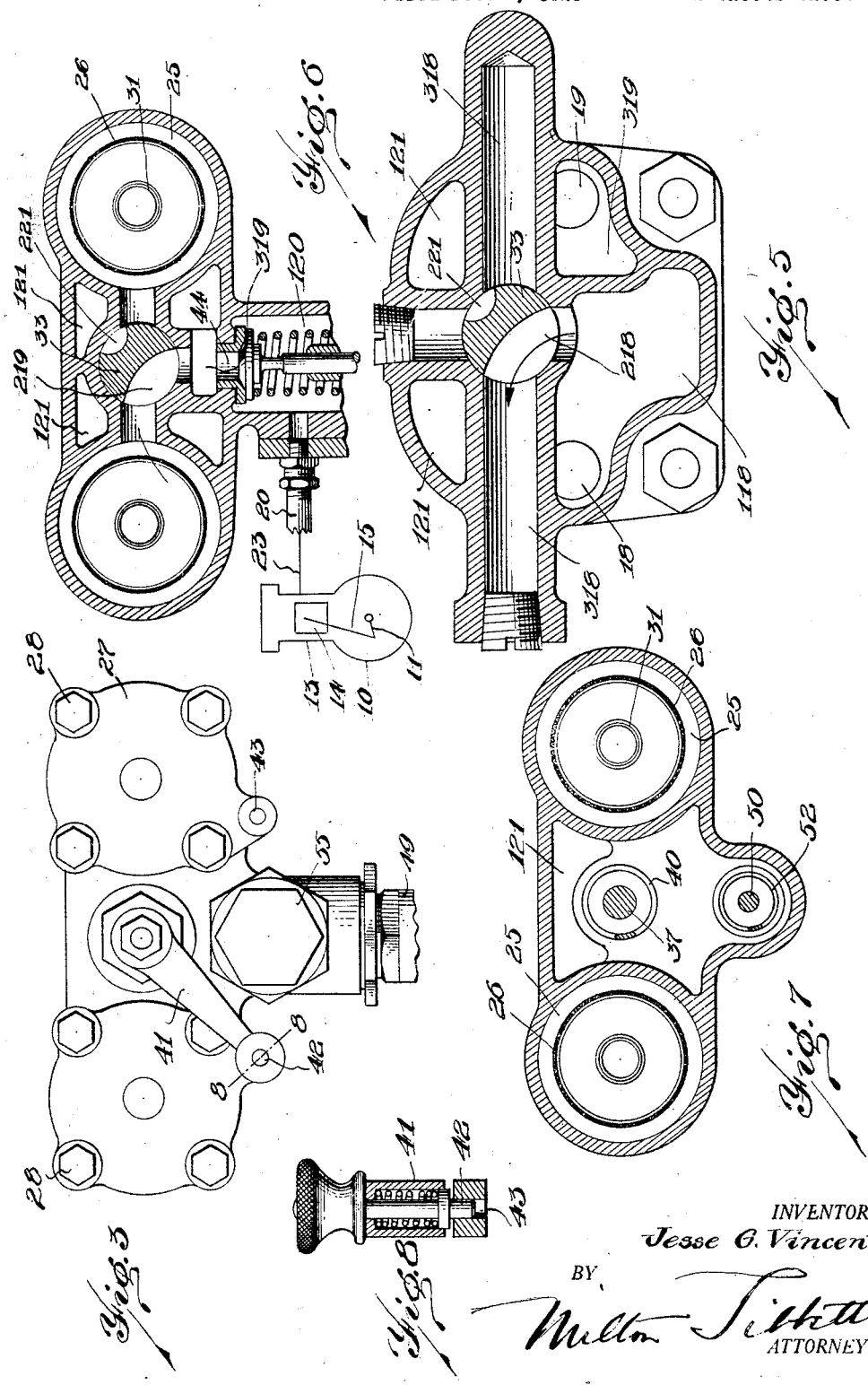

1,708,711

UNITED STATES PATENT OFFICE.

JESSE G. VINCENT, OF DETROIT, MICHIGAN, ASSIGNOR TO PACKARD MOTOR CAR COMPANY, OF DETROIT, MICHIGAN, A CORPORATION OF MICHIGAN.

HYDROCARBON MOTOR.

Application filed December 2, 1921. Serial No. 519,375.

This invention relates to hydrocarbon motors and particularly to the lubrication mechanism thereof.

One of the objects of the present invention is to provide a strainer or screening means for a lubrication system in which either of two strainers may be connected in the lubrication line, thus permitting one strainer to be cleaned while the other one is in use.

Another object of the invention is to provide a lubrication system in which there is a high pressure pipe line and a low pressure pipe line so that lubricant may be fed to various parts of the motor at different pressures.

Another object of the invention is to provide a lubrication screening device in which duplicate detachable screens are employed with suitable valves to cut one screen out of the line at a time for cleaning purposes.

Other objects of the invention will appear from the following description taken in connection with the drawings, which form a part of this specification, and in which:

Fig. 1 is a vertical section through a screen device made in accordance with this invention, together with a fragment of the motor crank case upon which the device is mounted and diagrammatic illustrations of the motor crank shaft and oil pump, the section being taken on the line 1—1 of Fig. 2;

Fig. 2 is a vertical section substantially on the line 2—2 of Fig. 1;

Fig. 3 is a plan view of the device shown in Figs. 1 and 2;

Figs. 4, 5, 6 and 7 are transverse sectional views on correspondingly numbered lines of Fig. 2, there being in Fig. 6 a diagrammatic illustration of a motor;

Fig. 8 is an enlarged section on the line 8—8 of Fig. 3; and

Fig. 9 is a view of the lower part of the hand valve.

Referring to the drawings, and particularly to Figs. 1 and 2, 10 represents a part of the crank case of a hydrocarbon motor and 11 is the motor crank shaft, diagrammatically shown in Fig. 1, with its bearings 12 which require lubrication under comparatively high pressure. The crank case and crank shaft are also illustrated diagrammatically in Fig. 6 and in that figure the motor cylinder is indicated at 13 and the piston and connecting rod at 14 and 15 respectively.

In Fig. 1 a lubrication pump is indicated at 16 and it will be understood that this pump is operated by the motor in the usual way, drawing the lubricant from the sump or bottom of the crank case, or from a tank to which the oil is pumped from the crank case, and pumping it into the system from which it returns to the crank case for further circulation.

Mounted upon the crank case 10 is a lubrication device adapted to receive the lubricant from the pump and screen it and distribute it to various parts of the motor. This device is in the form of a casting 17 which is suitably connected to the crank case and which has an inlet passage 18, a high pressure outlet passage 19, a low pressure outlet passage 20 and an overflow passage 21. The inlet passage 18 connects with the outlet from the pump 16, above referred to, the high pressure passage 19 connects with a pipe line 22 which carries lubricant to the main bearings 12 of the motor crank shaft, and the low pressure outlet 20 connects by a pipe line 23 with the cylinder or cylinders 13 of the motor. The overflow outlet or passage 21 connects through an opening 24 with the crank case so that all surplus oil is returned to the crank case for re-circulation. As shown, the inlet 18 and the outlet 19 pass through the crank case wall so that the pipes to which they are connected are located inside the crank case.

The casting 17 is formed with two screen pockets 25 which contain removable screens 26, the screens being held in place in the pockets by caps or covers 27 detachably secured by bolts 28. In each of the covers is a vent opening 29 closed by a thumb valve 30, whereby air may be released from the upper part of the strainer pocket as will hereinafter appear.

The lower end of each of the screens 26 has a tube 31 which slidably fits in an opening 32 in the bottom of the pocket 25 so that the interior of the screen may communicate through said tube 31 with a transverse passage 318 in the lower part of the casting 17.

Mounted in the casting 17 preferably between the strainer pockets 25, is a plug valve 33 having various passages therein as will be hereinafter described. The valve is mounted in a tapered bore 34 in the casting, the lower end of which bore communicates with the overflow passage 21 hereinabove described and as particularly shown in Figs. 1 and 2, and the plug is inserted from above through an opening 35 closed by a threaded sleeve 36 through which the stem 37 of the plug valve 33 passes. A packing nut 38 and packing 39 prevent leakage around the valve stem, and a spring 40 retains the valve on its tapered seat. There is a handle 41 connected to the upper end of the valve stem 37 for turning the valve, and a spring plunger 42 mounted in the outer end of the handle 41 retains the valve in either of its extreme positions, the plunger 42 operating in either of two openings 43 in the covers 27, as shown particularly in Figs. 3 and 8.

By referring to Fig. 5 it will be seen that the passage 18 communicates with a chamber 118 in the lower part of the casting and this chamber may be connected by a passage 218 in the valve 33 with the transverse passage 318 hereinabove referred to. In fact, the valve 33 divides the passage 318 into two parts, a right-hand part and a left-hand part, each of which parts connects with one of the screens 26, and when the valve 33 is in the position shown in Fig. 5 the chamber 118 communicates with the left-hand part of the passage 318, and when the valve is switched to its other extreme positon, or turned 90°, the chamber 118 is cut off from the left-hand part of the passage 318 and placed in communication with the right-hand part thereof. Thus the lubricant from the pump 16 may be fed to either of the two screens 26 and the other screen can be completely cut off from communication therewith for cleaning.

There is an outlet 119 from each of the screen pockets 25, and a passage 219 in the valve 33 connects either one or the other of said outlets 119, depending upon the position of the valve, with a high pressure chamber 319. This high pressure chamber 319 is cored in the casting 17 and extends downwardly therein and connects with the high pressure outlet 19 of the device, as shown particularly in Figs. 1, 5 and 6.

There is another outlet from the high pressure chamber 319 indicated at 44 in Figs. 2 and 6, and this outlet is controlled by a yielding valve 45, a spring 46 determining the pressure at which said valve opens, and an adjustable abutment 47 determining the pressure of the spring. The abutment 47 is mounted in a sleeve 48 threaded into the casting 17 and a cap 49 covers the end of the abutment 47 to protect the latter and prevent any leakage.

When the pressure in the chamber 319 is sufficient to raise the valve 45 from its seat, some of the lubricant passes through the port 44 into a low pressure chamber 120. This chamber is in communication with the outlet 20 above referred to which connects with the pipe line 23 leading to the motor cylinder walls for lubricating the latter. The pressure in this chamber 120 is determined by a valve 50 which controls a port 51 leading from the chamber 120, and a spring 52 determines the pressure of the valve 50 on its seat. An adjustable abutment 53 determines the pressure of the spring 52, the abutment being mounted in a threaded sleeve 54 and a cap 55 being provided over the end of the abutment. By this arrangement it will be seen that the spring pressure of the valve 50 will determine the degree of pressure in the chamber 20 and this is maintained at a lower pressure than that in the chamber 319 as it is not desired to feed lubricant to the cylinder walls at as high pressure as it is fed to the main bearings of the motor crank shaft.

The excess lubricant which flows from the low pressure chamber 120 through the port 51 passes into an overflow chamber 121, which latter chamber is cored out in the casting 17 and extends downwardly from the upper part of the casting to the lower part thereof as shown in the various figures. At its lower end it communicates with the outlet 21 and the opening 24 so that all of the excess lubricant passes downwardly into the crank case of the motor.

The valve 50 and its spring 52 are, of course, located in the chamber 121 and, as will appear from Figs. 1, 2 and 7, the valve stem 37 also passes through the upper part of the chamber 121 and the spring 40 is located therein. It will be evident, therefore, that whatever leakage there may be around the plug valve 33 will pass into the overflow passage 121 and drain to the crank case and there will be no appreciable pressure above atmosphere in the chamber 121 so that leakage along the valve stem 37 will be at a minimum.

In order that one of the screen pockets may be drained when the other one is in use the valve 33 is formed with a drainage groove 221 which is shown as extending longitudinally of the valve far enough to register with both the passage 318 and the passage 119 and with its lower end communicating with the chamber 121. This groove is particularly shown in Figs. 1 and 9, as well as in Figs. 5 and 6 and it will be seen that when the left-hand screen pocket is in communication with the lubrication line by the passages 218 and 219, as the parts are shown in Figs. 5 and 6, the drainage groove 221 opens communication between right-hand passage 318, right-hand outlet 119, and the lower part of overflow chamber 121, so that practically all of the lubricant left in the pocket 25 will drain into the crank case. This may be facilitated by opening the valve 30 on top of the screen pocket, thus permitting air to enter at the top of the pocket. Also, after the right-hand screen has been removed and cleaned and returned to the right-hand pocket, the valve 33 may be turned to place the right-hand screen pocket in the lubrication line and the valve 30 may then be opened to permit air to escape from the screen pocket. As soon as lubricant appears through the vent 29 the valve 30 will be closed and the right-hand screen will then be in full operation. The left-hand screen may then be removed for cleaning and the operation repeated as often as desired without stopping the motor. In both of its extreme positions the valve 33 is retained against accidental movement by the plunger 42 above described.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

Having thus described my invention, what I claim and desire to secure by Letters Patent is:

1. A device for lubricating the bearings of engines comprising a high pressure chamber, a source of lubricant under high pressure connected thereto, a low pressure chamber, a spring loaded valve between said chambers, means to supply lubricant from the high pressure chamber to some of the engine bearings and means to supply lubricant from the low pressure chamber to other engine bearings.

2. A device for lubricating the bearings of engines comprising a high pressure chamber, a source of lubricant under high pressure connected thereto, a low pressure chamber, an overflow chamber, means communicating with the low pressure chamber to limit pressure in the high pressure chamber, means communicating with the overflow chamber to limit pressure in the low pressure chamber, and means to supply lubricant from the high pressure chamber to some of the engine bearings and from the low pressure chamber to other engine bearings.

3. A lubrication device for engines comprising high and low pressure chambers, means supplying lubricant to the low pressure chamber from the high pressure chamber adapted to limit the pressure in said high pressure chamber, means to limit the pressure in said low pressure chamber, means to conduct lubricant from the high pressure chamber to certain parts of said engine, and means to conduct lubricant from the low pressure chamber to other parts of said engine.

4. A lubrication device for engines comprising a pump, a high pressure chamber, means to supply lubricant from the high pressure chamber to parts of said engine, a low pressure chamber, means connecting said chambers adapted to limit the pressure in the high pressure chamber, means to supply lubricant from the low pressure chamber to other parts of said engine, a pair of screen devices adjacent said chambers, and means including a valve to supply lubricant from the pump to the high pressure chamber through either one or the other of said strainers, the flow being controlled by said valve.

5. In a lubrication system, the combination with the main pressure line, of a pipe connection leading therefrom for high pressure distribution, a yielding valve controlling the maximum pressure from the main line, a second valve beyond the first valve for controlling the pressure between the valves, and a pipe connection leading from the space between said valves for low pressure distribution of lubricant.

6. A lubrication device comprising a high pressure pipe line, an overflow chamber, an intermediate or low pressure chamber, a high pressure valve operating between the main pipe line and the intermediate chamber, and a low pressure valve operating between the intermediate chamber and the overflow chamber.

7. In a hydrocarbon motor, the combination with the crank case and cylinders thereof, of a pump for drawing oil from the crank case and feeding it under high pressure to the crank shaft bearings, a valve device to limit the maximum pressure, piping leading oil overflowing from said valve device to the motor cylinder wall, and a second valve device to limit the maximum pressure in said piping, the overflow from said second valve device returning to the motor crank case.

8. A lubrication device comprising a casting having screen pockets therein, screens in said pockets, a hand valve for connecting said pockets in the lubrication line, and spring valves in said casting controlling the flow of lubricant therethrough.

9. In a hydrocarbon motor, the combination with the motor crank case, of a casting mounted thereon provided with screens and having three passages communicating with passages in the crank case, one of said passages being an inlet to the casting, one of them being a pressure outlet, and the other being an overflow outlet.

10. In a hydrocarbon motor, the combination with the motor crank case, of a casting mounted thereon and having three passages communicating with passages in the crank case, one of said passages being an inlet to the casting, one of them being a pressure outlet, and the other being an overflow outlet, and means in the casting for straining lubricant.

11. In a hydrocarbon motor, the combination with the motor crank case, of a casting mounted thereon and having three passages communicating with passages in the crank case, one of said passages being an inlet to the casting, one of them being a pressure outlet, and the other being an overflow outlet, and duplicate strainer devices mounted in the casting and adapted to be alternately connected in the lubrication line.

12. A device for lubricating the bearing parts of an engine comprising a casting having high and low pressure chambers, an overflow chamber and a pair of strainers, pressure responsive valves between the high and low pressure chambers and between the low pressure and overflow chambers, means connecting the high and low pressure chambers to different bearing parts respectively, and a valve adapted to control the supply of lubricant through either of the strainers to the high pressure chamber, said valve being arranged to discharge leakage into the overflow chamber.

13. A lubrication device comprising a plurality of pressure chambers connected in series, pressure operated means to control the flow of lubricant between successive chambers and to provide a difference in the lubricant pressure developed in the said chambers, and separate means connecting the chambers to different parts of the device to be lubricated.

In testimony whereof I affix my signature.

JESSE G. VINCENT